UNITED STATES PATENT OFFICE.

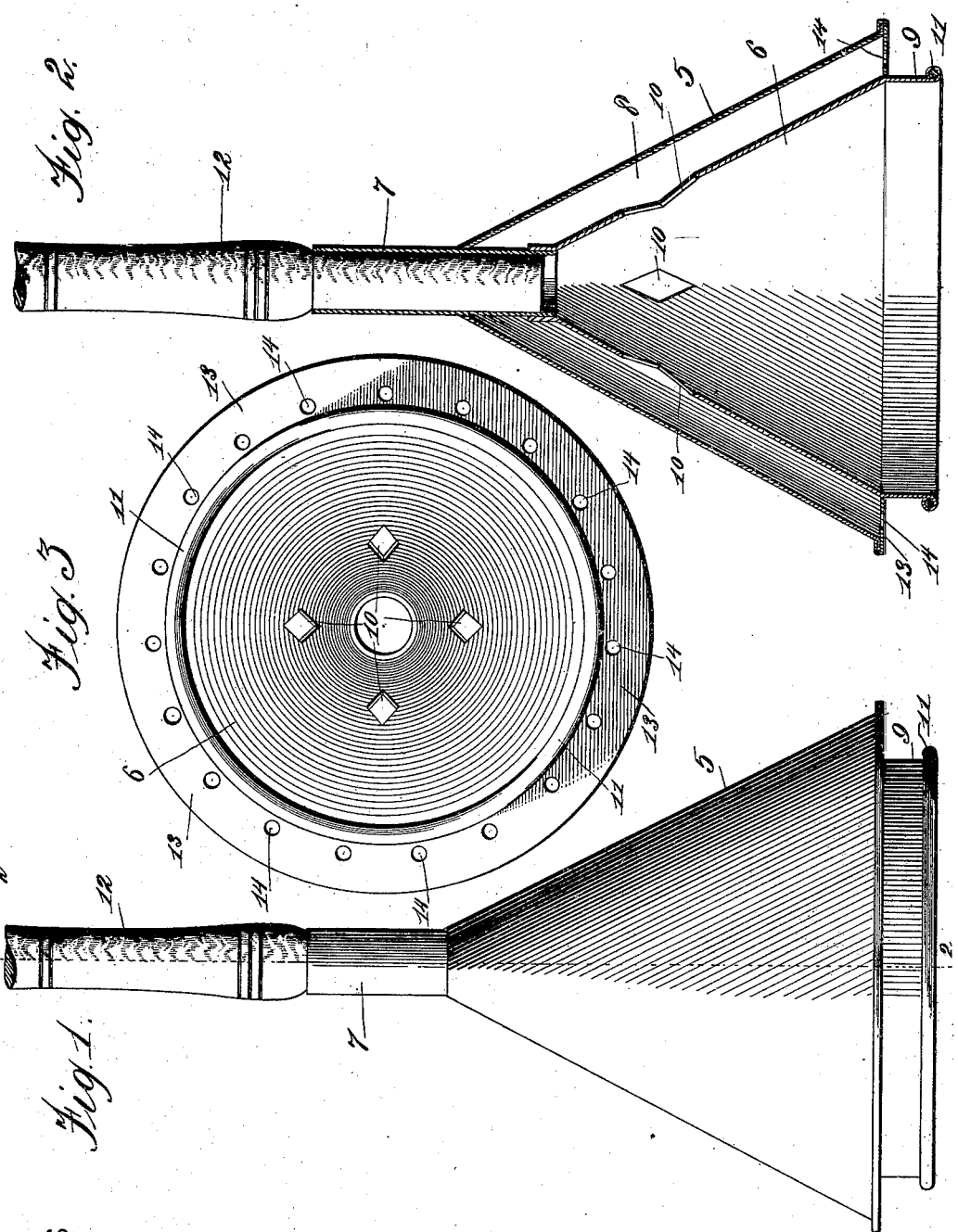

KENNETH DONALD McLAY, OF DAUPHIN, CANADA.

CLOTHES-POUNDER.

SPECIFICATION forming part of Letters Patent No. 709,109, dated September 16, 1902.

Application filed June 13, 1901. Serial No. 64,362. (No model.)

*To all whom it may concern:*

Be it known that I, KENNETH DONALD MC-LAY, a subject of the King of Great Britain, residing at Dauphin, county of Marquette, Province of Manitoba, Canada, have invented certain new and useful Improvements in Clothes-Pounders; and I do hereby declare that the following is a full, clear, and exact description of the invention, such as will enable others skilled in the art to which it appertains to make and use the same.

My invention relates to improvements in clothes-pounders; and the object in view is the provision of a simple, efficient, and cheap instrument which is so constructed that it will act both by suction and air pressure upon the fabrics or clothes, so as to thoroughly and quickly eliminate dirt therefrom.

To the accomplishment of these ends my invention consists in the novel construction and arrangement of parts, which will be hereinafter fully described and claimed.

In the accompanying drawings, forming a part of this specification, Figure 1 is a side elevation of my improved clothes-pounder. Fig. 2 is a longitudinal section on the line 2 2 of Fig. 1. Fig. 3 is an inverted or bottom plan view.

The same numerals of reference denote like parts in all the figures of the drawings.

The pounder consists, primarily, of an outer conical shell 5 and an inner conical shell 6, the same being united in any suitable way to a vertical central socket-tube 7. The outer shell 5, as well as the inner shell 6, is preferably made from galvanized sheet metal, although any other suitable material may be employed, and said inner shell 6 is arranged in concentric relation to the outer shell 5, thereby producing an intermediate space or chamber 8. The outer shell consists of an imperforate piece of sheet metal bent to the proper form and united to the socket-tube. The inner shell, however, is provided with a foot-flange 9, which is of cylindrical form and is disposed at an angle to the shell so that it lies concentric with the vertical axis of said shell 6. Said inner shell is furthermore provided with the openings 10, the same being represented by Figs. 2 and 3 as of diamond shape and formed in the upper smaller part of the shell 6, quite near the lower extremity of the socket-tube 7. These openings establish free and uninterrupted communication between the chamber of the shell 6 and the space or chamber 8, which is formed by and between the two shells 5 6. The circular foot-flange 9 of the inner shell extends a suitable distance below the lower edge of the outer shell 5, and said flange is bent or rolled upon itself, so as to form the bead 11, thus overcoming the provision of a sharp edge, which is liable to tear the clothes.

The socket-tube 7 is united to the upper smaller ends of the shells 5 6 by soldering these parts together when they are made of sheet metal; but this detail may be varied by the skilled constructor. This socket-tube is adapted to receive the staff or handle 12, the latter being of any appropriate material and size.

13 designates an annular pressure plate or ring, which is arranged in a horizontal position across the face of chamber 8 and at the lower edge of the outer conical shell 5. Said plate or ring is jointed to said lower edge of the shell 5, and it is likewise joined to the inner shell 6 at the line where the foot-flange 9 merges into the same. Furthermore, the plate or ring has an annular series of openings 14, which provide for the escape of the air from the space or chamber 8 on the downward movement of the pounder.

In the service of the implement the clothes or fabrics are immersed in soapy water, and the implement is worked up and down in the bath and so as to strike the fabrics. During the downward movement of the pounder the foot-flange and the plate or ring are adapted to exert pressure upon the fabrics, and the entrance of the pounder into the bath forces the air through the openings 10 of the shell 6. The expulsion of air from the chamber of the shell 6 creates a pressure in the surrounding space or chamber 8, and this air under pressure flows through the apertures 14, so as to act upon the fabrics, whereby the dirt is eliminated from the fabrics by the suction and by the air-pressure.

It is deemed important that the outer shell be concentric with the inner shell for the entire length thereof and that the foot-flange 9 be disposed below the lower end of the outer shell so that the horizontal flange 13 be at a distance from the lower end of the foot-flange, so as to leave an open unobstructed space beneath the said horizontal flange, as shown, for the free passage of the air through the apertures 14 in said flange or pressure-plate.

Having thus described my invention, what I claim as new is—

As an improved article of manufacture, the clothes-pounder herein described comprising an imperforate conical shell, a separate inner conical shell concentric therewith with the lower edge of its conical portion terminating in a horizontal plane with the lower edge of the first-mentioned shell, the said inner shell being provided near its upper end with openings and formed with a circumferential vertical walled foot-flange of less diameter than the bottom of the outer shell and extended beyond the lower edge of the latter and having its bottom edge rolled outward and upon itself, a socket-tube uniting the upper ends of the two shells, and an annular horizontal plate secured to the lower edge of the outer shell and to the inner shell at the point of junction of its conical portion and foot-flange and having perforations communicating with the space between the two shells, all substantially as shown and described and for the purpose specified.

In witness whereof I have hereunto set my hand in the presence of two witnesses.

KENNETH DONALD McLAY.

Witnesses:
W. L. SWAIN,
A. McLAY.